(12) United States Patent
Huang et al.

(10) Patent No.: US 8,831,070 B2
(45) Date of Patent: Sep. 9, 2014

(54) METHOD AND APPARATUS FOR START OF FRAME DELIMITER DETECTION

(75) Inventors: Li Huang, Eindhoven (NL); Ben Busze, Den Bosch (NL); Guido Dolmans, Son en Breugel (NL)

(73) Assignee: Stichting IMEC Nederland, Eindhoven (NL)

( * ) Notice: Subject to any disclaimer, the term of this patent is extended or adjusted under 35 U.S.C. 154(b) by 143 days.

(21) Appl. No.: 13/703,847

(22) PCT Filed: Jun. 21, 2011

(86) PCT No.: PCT/EP2011/060327
§ 371 (c)(1),
(2), (4) Date: Jan. 17, 2013

(87) PCT Pub. No.: WO2011/161095
PCT Pub. Date: Dec. 29, 2011

(65) Prior Publication Data
US 2013/0114645 A1     May 9, 2013

Related U.S. Application Data

(60) Provisional application No. 61/358,210, filed on Jun. 24, 2010.

(51) Int. Cl.
*H04L 27/06* (2006.01)
*H04L 7/04* (2006.01)
*H04B 1/7083* (2011.01)
*H04L 12/741* (2013.01)

(52) U.S. Cl.
CPC ............... *H04L 45/74* (2013.01); *H04L 7/042* (2013.01); *H04B 1/7083* (2013.01)
USPC ......................................... 375/147; 375/150

(58) Field of Classification Search
CPC ......... H04L 7/041; H04L 7/042; H04L 7/043; H04L 7/044; H04L 1/0079
USPC .......... 375/147, 150, 365; 370/513, 514, 515, 370/350, 509
See application file for complete search history.

(56) References Cited

U.S. PATENT DOCUMENTS 5,151,920 A    9/1992   Haagh et al.
5,949,817 A    9/1999   Marshall
(Continued)

FOREIGN PATENT DOCUMENTS

WO   WO2008/004984 A1   1/2008
WO   WO2008/038986 A1   4/2008

OTHER PUBLICATIONS

PCT International Search Report and Written Opinion, PCT International Application No. PCT/EP2011/060327 dated Oct. 11, 2011.
(Continued)

*Primary Examiner* — Aristocratis Fotakis
(74) *Attorney, Agent, or Firm* — McDonnell Boehnen Hulbert & Berghoff LLP

(57) ABSTRACT

The present disclosure is related to detecting a start frame delimiter. A received data packet is correlated with a known sequence, which provides a first correlation result. The received data packet is correlated with a predefined sequence, which yields at least a second correlation result. The data packet comprises at least a preamble portion and a header portion, whereby the preamble portion comprises the start frame delimiter. The predefined sequence is determined according to the preamble pattern. The method further comprises comparing the first correlation result with the second correlation result and comparing the first correlation result with a given threshold. The process of correlating will be continued until two criteria are met: the first correlation result is larger than the threshold and larger than the at least second correlation result. Only then it is decided that the start of frame delimiter pattern has been detected.

18 Claims, 10 Drawing Sheets

(56) References Cited

U.S. PATENT DOCUMENTS

| | | | |
|---|---|---|---|
| 6,658,063 B1* | 12/2003 | Mizoguchi et al. | 375/260 |
| 7,006,587 B1* | 2/2006 | Lewis et al. | 375/365 |
| 7,577,188 B1 | 8/2009 | Lewis | |
| 2005/0195770 A1 | 9/2005 | Baliga et al. | |
| 2007/0086423 A1* | 4/2007 | Zeng et al. | 370/349 |
| 2007/0104297 A1 | 5/2007 | Gorday | |
| 2007/0274261 A1 | 11/2007 | Sahinoglu et al. | |
| 2007/0286314 A1* | 12/2007 | Herzinger et al. | 375/343 |
| 2008/0043886 A1* | 2/2008 | Inagawa et al. | 375/343 |
| 2009/0175261 A1* | 7/2009 | Oh et al. | 370/350 |
| 2009/0207944 A1 | 8/2009 | Furman et al. | |
| 2009/0285269 A1* | 11/2009 | Zhang et al. | 375/150 |
| 2009/0310653 A1 | 12/2009 | Gorday | |
| 2010/0142647 A1 | 6/2010 | Dubouloz et al. | |
| 2010/0215135 A1* | 8/2010 | Okada | 375/362 |
| 2011/0116534 A1* | 5/2011 | Seibert et al. | 375/224 |

OTHER PUBLICATIONS

Desset, Claude et al., "UWB Search Strategies for Minimal-Length Preamble and a Low-Complexity Analog Receiver", Signal Processing Advances in Wireless Communications, IEEE 7th Workshop, Jul. 1, 2006, pp. 1-5.

Mercier, Patrick R et al., "A Low-Voltage Energy-Sampling IR-UWB Digital Baseband Employing Quadratic Correlation", IEEE Journal of Solid-State Circuits, vol. 45, No. 6, Jun. 2010, pp. 1209-1219.

* cited by examiner 1 bit is spread over $L_{sc}$ chips

US 8,831,070 B2

METHOD AND APPARATUS FOR START OF FRAME DELIMITER DETECTION

CROSS REFERENCE TO RELATED APPLICATIONS

The present application is a national stage entry of PCT/EP2011/060327, filed Jun. 21, 2011, which claims priority to U.S. Provisional Patent Application Ser. No. 61/358,210, filed Jun. 24, 2010. The full disclosures of U.S. Provisional Patent Application Ser. No. 61/358,210 and PCT/EP2011/060327 are incorporated herein by reference.

FIELD OF THE INVENTION

The present invention generally relates to wireless communications. In particular, packet-based communication is considered wherein each packet includes a synchronisation preamble portion containing a start of frame delimiter.

BACKGROUND OF THE INVENTION

A typical wireless packet includes a synchronization preamble (SHR) portion, a physical header (PHR) portion and a data portion (also called the 'payload') transmitted in that order, as illustrated in FIG. 1. The SHR preamble contains a synchronisation field and a start of frame delimiter (SFD). The SHR preamble is used to achieve signal acquisition, signal synchronization and ranging. The SFD is used to detect the end of the synchronisation field, the end of the synchronisation preamble as a whole and the start of the physical header. Hence, the SFD serves as a delimiter between the SHR and the PHR. The PHR is used to provide the receiving system with information concerning the data that will follow, such as an indication of how much data is being sent in the packet and what signalling or protocol is being used to transmit the data or payload.

In general, the more received bits the receiver has available for synchronization, the better, resulting in the data packet being received and interpreted more reliably.

In certain implementations, like in preamble based ultra low power wireless communications, the length of the SFD is normally short to minimize the energy wasted for non-data communication. However, this short SFD length makes it for the receiver difficult to identify the end of preamble and thus may lead to wrongly detected or missed starting position of data in the signal packet, which may result in significant packet loss and/or energy increase due to packet retransmission. These effects become more serious for low signal-to-noise scenarios, which are typically encountered in ultra low power wireless communications.

Prior art document US2007/086423 is concerned with modified start frame delimiter detection. It mainly tackles the problem that where synchronization is performed using the decoded but not yet de-scrambled received signal, it would be necessary to consume one or more of the bits intended for synchronization in the initialization of a de-scrambler at the receiving system in order to detect the SFD. In the proposed solution the receiving system scans a decoded but not yet de-scrambled received signal for a scrambled version of the SFD associated with the preamble format being used. In this way the availability of these bits for synchronization operations is not lost. In addition, especially where a short preamble is used, it is advantageous that more bits of the preamble are made available for synchronization while still reliably detecting the SFD.

US2005/195770 also deals with frame synchronisation. A system is disclosed for receiving and handling a scrambled input data signal that includes a preamble with a start of frame delimiter (SFD). Instead of performing the SFD search on the descrambled data, the system initiates an SFD search on the scrambled input data, thereby attempting to save an initialization period on the descrambler.

Patent U.S. Pat. No. 5,949,817 discloses a multi-level correlation technique and apparatus for detecting symbol and data frame synchronization in high noise and multi-path environments. Received signals are correlated with known pseudorandom noise (PN) or other known codes at the base level and the base level correlation results are in turn correlated with PN or other known codes at the next higher level, such that the top level of correlation includes all lower levels of encoding in the complete synchronization pattern. The proposed solution provides reliable synchronization detection in low signal-to-noise ratio and/or multi-path environments.

US2009/285269 relates to a method of extracting data from data packets transmitted over a wireless network that includes receiving a data packet having a preamble portion and a payload portion. The preamble portion is cross correlated with a first known spreading sequence to generate a first timing signal and the preamble portion is cross correlated with a second known spreading signal to generate a frame timing signal. An impulse is detected in the first timing signal and a first timing parameter is set based upon the detected impulse in the first timing signal. An impulse is detected in the frame timing signal and a frame timing parameter is set based upon the detected impulse in the frame timing signal. Data is extracted from the received payload portion according to the first timing parameter and the frame timing parameter.

AIMS OF THE INVENTION

The present invention aims to provide a method and apparatus for start frame delimiter detection with improved performance (in terms of energy, data rate, false SFD detection avoidance) while leaving the structure of the signal packets unchanged. The invention further aims to provide a method for performing signal acquisition on a data packet wherein said method and apparatus for start frame delimiter detection is applied.

SUMMARY

The present invention relates to a method for detecting a known start of frame delimiter pattern in a received stream of samples of a data packet. The data packet comprises at least a preamble portion and a header portion, whereby the preamble portion precedes the header portion and contains the start of frame delimiter pattern. The method comprises the steps of
  correlating a portion of said received stream of samples of said data packet with a first sequence corresponding to said start of frame delimiter pattern, thereby obtaining a first correlation result,
  comparing said first correlation result with a given threshold,
  correlating said portion of said received stream of samples with a second sequence, said second sequence derived from a pattern present in said preamble portion and different from said first sequence, thereby obtaining a second correlation result,
  comparing said first correlation result with said second correlation result, if said first correlation result is larger than said given threshold and larger than said second correlation result, deciding that said start of frame delimiter pattern has been detected, otherwise, repeating the previous steps with a further portion of said first and second sequence.

In practice one can opt to perform first both correlating steps and then the comparing steps. Obviously, it does not matter which of the two comparisons is made first. Both conditions on the comparison outcomes have to be met before one can decide that the start of frame delimiter pattern has been detected.

The proposed method indeed achieves the above-mentioned objectives. The packet structure is not affected by the various steps of the method. By introducing a second evaluation criterion it can be decided in a more reliable way that the start of frame delimiter pattern has indeed been detected. Performing this additional evaluation requires negligible power and size increase in a digital implementation.

In a preferred embodiment the method comprises a step of determining that second sequence.

In another preferred embodiment the method comprises at least one further step of correlating with a further sequence, that is derived from a further pattern present in the preamble portion and different from the first and second sequence, whereby a further correlation result is obtained. The first correlation result is compared with the further correlation result, whereby the first threshold should be larger than the further correlation result to detect the start of frame delimiter pattern.

The given threshold with which the first correlation result is compared, is advantageously derived from a received noise power estimation.

The second sequence has preferably the same length as the first sequence. In an advantageous embodiment the second sequence is the pattern in the preamble portion that yields the largest correlation value when correlated with the start of frame delimiter pattern, leaving aside the first sequence.

In an aspect the invention also relates to a method for performing data acquisition on a stream of samples of data packets received in a receiver device. The method comprises the steps of detecting in the receiver device a received data packet by correlating the stream of samples with a random sequence until a correlation result is obtained larger than or equal to a predetermined noise level threshold, estimating a sampling position for a code symbol of said random sequence and estimating a position for forming a bit by combining one or more code symbols, and detecting a start of frame delimiter pattern with the method as previously described.

In an embodiment of the invention the method comprises the step of performing a noise power estimation and computing the predetermined noise level threshold from that estimation.

In a preferred embodiment the random sequence is a pseudo-noise sequence containing a plurality of code symbols. The receiver is then a direct sequence spread spectrum receiver. Alternatively, the random sequence contains only one code symbol. The system then is a non-direct sequence spread spectrum system.

In another aspect the invention relates to a device for detecting a known start of frame delimiter pattern. The device comprises receiver means for receiving a stream of samples of a data packet, said data packet comprising at least a preamble portion and a header portion, said preamble portion preceding the header portion and containing the start of frame delimiter pattern, first correlating means for correlating a portion of the received stream of samples of the data packet with a first sequence corresponding to the start of frame delimiter pattern, thereby obtaining a first correlation result, first comparing means for comparing the first correlation result with a given threshold, second correlator means for correlating the portion of the received stream of samples with a second sequence, said second sequence derived from a pattern present in the preamble portion and different from the first sequence, thereby obtaining a second correlation result, second comparing means for comparing the first correlation result with the second correlation result, combining means for combining the outcomes of said comparing means.

The first and second correlator means are preferably sliding correlators.

The first and second correlator means advantageously comprise a finite impulse response filter.

A solution is provided for improved start of frame delimiter detection performance without modifying the structure of the signal packet. The approach according to the invention allows detection of SFD whereby energy and data rate are reduced and false SFD detection and retransmission is avoided. This is very desirable for ultra low power wireless communications. Compared with the conventional SFD detection, an additional evaluation criterion is used to check whether the SFD is detected. This is obtained without modifying the structure of the signal packet. The additional evaluation criterion requires negligible power and size increase in digital implementation. Conventionally, after the receiver finds the sampling position, it starts to demodulate signals and slides the demodulated signals with the SFD sequence until a certain threshold is crossed. In the proposed detection approach (when a threshold related to the estimated noise power is exceeded) the considered demodulated signals are correlated with another predefined sequence having the same length of SFD sequence. The choice of this predefined sequence is not based on a codebook that includes all possible bit patterns having the same length of the SFD sequence. Instead it is chosen according to the preamble pattern. By using a sliding window that spans the preamble and correlating it with the SFD sequence, the sequence inside the window that yields the second largest correlation result (the largest result will be of the SFD sequence itself) is determined as predefined sequence. When the correlation result from the SFD sequence is larger than that from the predefined sequence, SFD is detected. Otherwise, the demodulated signals need to continue correlating until two criteria are met: the correlation result with the SFD sequence is larger than the threshold and larger than that with the predefined sequence. The concept of using one predefined sequence can be generalized to using a number of predefined sequences (third largest, fourth largest, and so on).

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION OF THE INVENTION

Figure 1:
FIG. 1 illustrates a structure of a data packet.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting of only components A and B. It means that with respect to the present invention, the only relevant components of the device are A and B.

It should be appreciated that the present invention can be implemented in numerous ways, including as a process, an apparatus, a system or a computer readable. It should be noted that the order of the steps of disclosed processes may be altered within the scope of the invention.

In the present invention an approach is disclosed for detecting a start of frame delimiter (SFD) in a stream of samples, wherein apart from the conventional correlation and comparing operations an additional correlation and comparison is performed before it is decided that the SFD is indeed detected.

In preamble based ultra low power wireless communications, the signal packet format normally comprises of three major components: the synchronization header (SHR) preamble, the physical layer header (PHR) and the data field as shown in FIG. 1. The SHR preamble includes a synchronization field and a start frame delimiter (SFD) and is used by the timing acquisition algorithm. Such an algorithm is necessary in order to be able to detect that there is a packet on the wireless channel and to synchronize with this packet for proper demodulation and decoding. The PHR conveys information to the receiver necessary for a successful packet decoding. The data field can include media access control (MAC) header, payload and cyclic redundancy check (CRC). Both the PHR and the data field are extracted by the proposed detection algorithm.

The approach of the invention is explained below taking as example direct-sequence spread spectrum (DSSS) systems, where the SFD detection is typically the last step. Note that the DSSS system spreads the baseband signal by directly multiplying the baseband signal with a pseudo-noise (PN) sequence consisting of a number of PN code symbols, e.g. IEEE 802.15.4 and DS-CDMA systems. Since 'normal' (i.e. non-DSSS) systems, wherein no multiplication of the baseband signal with a PN sequence is performed, can be considered as a DSSS system where the PN length is 1, the present approach can easily be extended to such systems. Besides the two criteria in the SFD detection step, also the appropriate use of different versions of the PN sequence (i.e. different alphabets for the PN sequence) in different steps of the timing acquisition algorithm is considered in the proposed approach.

Figure 2:
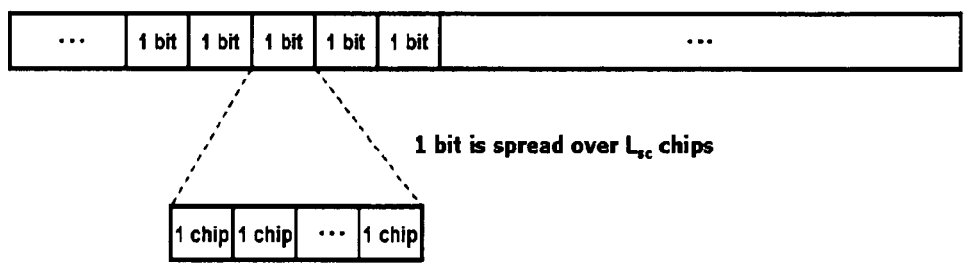
FIG. 2 illustrates a spread spectrum system.

The DSSS technique spreads the baseband signal by directly multiplying the baseband signal with a PN sequence consisting of a number of PN code symbols. A PN code symbol is called a chip and the number of chips in the PN sequence is denoted $L_{sc}$ as shown in FIG. 2. The resulting effect of enhancing signal to noise ratio on the channel is called the processing gain. This effect can be made larger by employing a longer PN sequence, i.e. by combining more chips per bit.

In a timing acquisition algorithm the receiver needs to search all possible positions in order to find the location where the received signal can be recovered with maximal energy. For a DSSS system, three timing information parameters need to be estimated:

- the pulse-level position, i.e. the position where the signal can be sampled within one chip.
- the code-level position: this is the position where signals start to be combined to form one bit.
- the bit-level position, which is the position where the data payload effectively starts.

The offsets between the sampling positions and their ideal positions are referred to as the pulse-, code-, and bit-level offsets, respectively.

Typically, there are two possible acquisition strategies searching for the pulse- and code-level positions as for example presented in "*UWB search strategies for minimal-length preamble and a low-complexity analog receiver*" (C. Desset et al., *Proc. IEEE Workshop on Statistical Signal Process. Advances in Wireless Commun.* (*SPAWC*), Cannes, July 2006, pp. 1-5): either searching first for the pulse-level position afterwards for the code-level position, or jointly searching for both positions. The first strategy in principle requires a smaller search space compared with the second strategy as the searching of two positions is decoupled. However, this strategy has a poor energy accumulation when searching for the pulse-level position. This is undesirable for ultra-low power systems where the transmit power is very small for one chip. In addition, this first strategy requires a longer preamble as the two positions are searched sequentially. The considered timing acquisition algorithm preferably relies on the second strategy, i.e. jointly searching for both the pulse- and code-level positions, to minimize the required preamble length.

Figure 3:
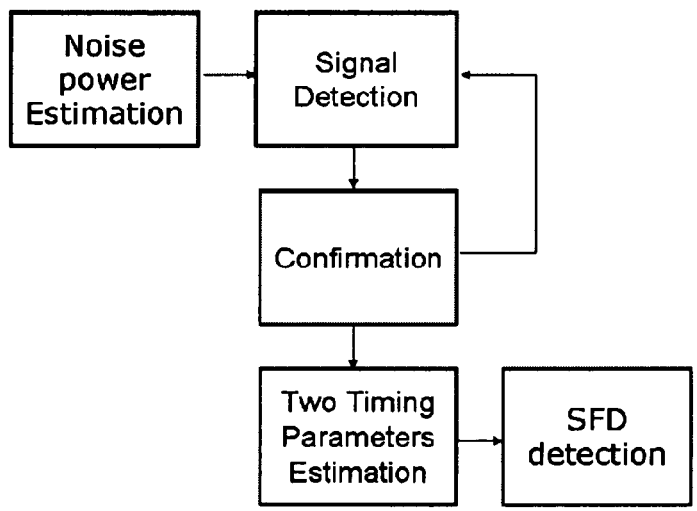
FIG. 3 illustrates a flowchart of the timing acquisition steps.

The approach with an additional criterion for detecting the SFD is illustrated within a five-step timing acquisition algorithm. Note however that the invention is not limited thereto, as the approach fits within any acquisition algorithm that requires SFD detection. The flowchart of the five steps of the considered timing acquisition algorithm is illustrated in FIG. 3. As shown, these five steps include noise power estimation, signal detection, confirmation, estimation of two timing parameters and SFD detection.

Figure 4:
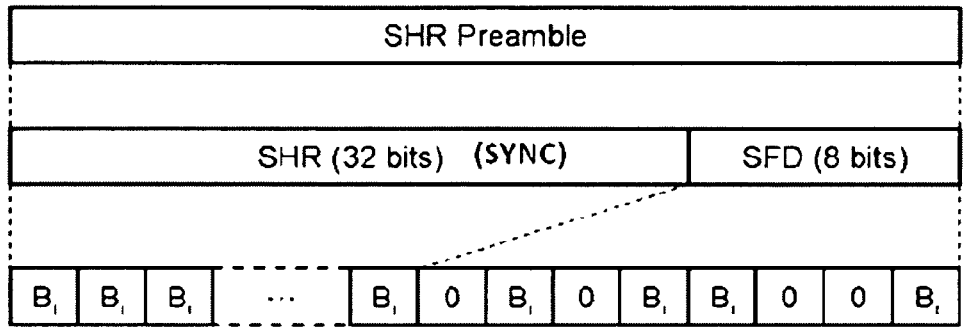
FIG. 4 illustrates a structure of a synchronization header preamble.

The considered preamble is illustrated in FIG. 4. As already mentioned, the SHR preamble consists of two parts: the SHR synchronization (SYNC) field and the SFD. The SYNC field consists of a number of identical SHR bits $B_i$. This SHR bit is spread with the PN sequence when a DSSS system is considered. The SFD is used to indicate the end of preamble. It is obtained by spreading a specially designed sequence (i.e. the SFD sequence) with the SHR bit $B_i$. This SFD sequence is a special sequence having good autocorrelation properties and low cross-correlation with its circularly shifted permutations in order to avoid false alarms.

Step 1: Noise Power Estimation

When starting the timing acquisition, the receiver needs to estimate the noise power in order to define a threshold so that the received stream of signal samples can be distinguished from the noise. This is especially needed when working at a low signal-to-noise ratio (SNR). In addition, the estimated noise power can also be used to control the variable gain amplifier (VGA) placed before the analog-to-digital converter (ADC). Note that this step may not need to be performed for every packet, since the noise power normally remains constant in adjacent packets. The noise power is estimated by averaging power over a number of samples assuming that these samples only contain noise. This assumption is realistic as the receiver is typically switched on to receive the signals before the packet is received.

Step 2: Signal Detection

In this step the presence of a signal packet is identified. It continuously correlates the received samples with a (circularly shifted) replica of the PN sequence used to spread the signal until the correlation result is above the threshold. It utilizes the joint estimation of pulse- and code-level positions principle.

The ideal pulse-level position is the position where the signal is the maximal in one chip. Depending on the required resolution, there are $L_s$ possible pulse-level positions within one pulse duration to be searched. The choice of $L_s$ is a trade-off between the timing resolution and complexity. In general, there are two methods to obtain samples from these $L_s$ possible pulse-level positions. The first one is to use a higher-speed ADC to oversample the chip $L_s$ times. The second one is to use a delay line such that the samples can be obtained over $L_s$ chips. Either method can be used in the approach considered here.

Figure 5:
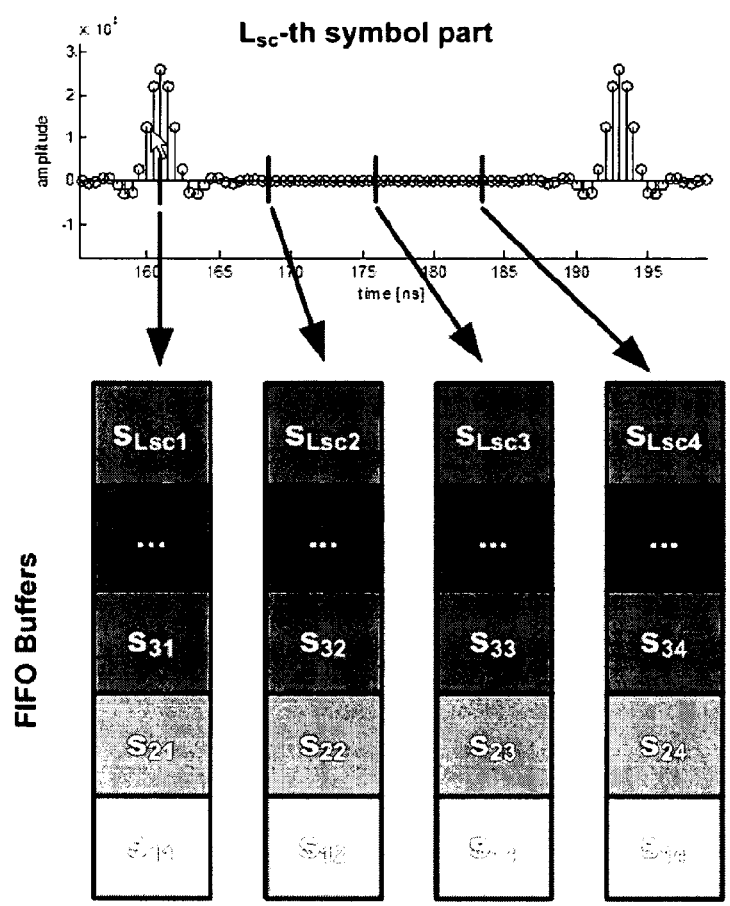
FIG. 5 illustrates a possible implementation for storing samples.
Figure 6:
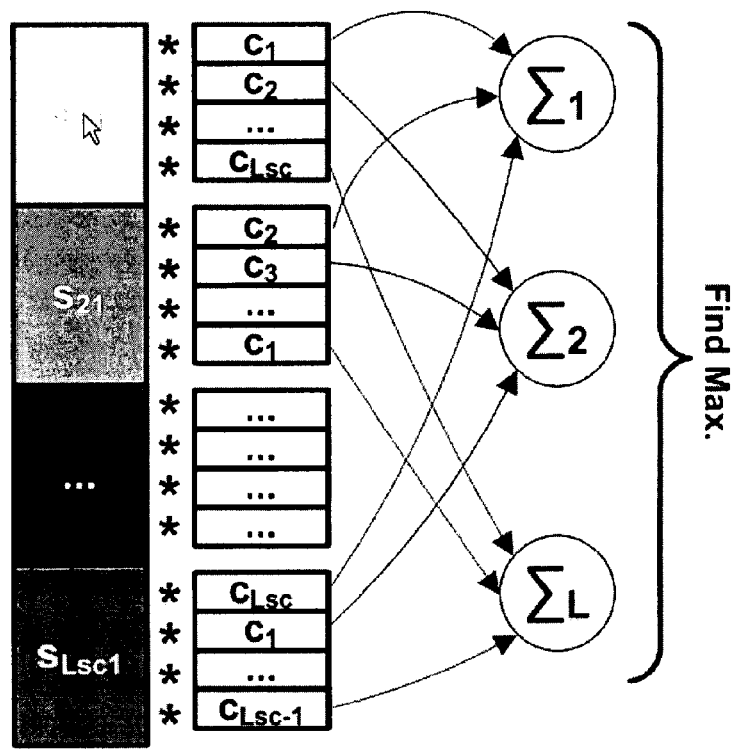
FIG. 6 illustrates the concept of finding the maximum of all correlations.

The principle of joint estimation of the pulse- and code-level position can be illustrated in the following implementation example. First, a total of $L_s$ first in first out (FIFO) buffers is used to store samples. Each buffer corresponds to one possible pulse-level position. After sampling a whole SHR bit, all the $L_s$ buffers are filled with $L_{SC}$ samples (see FIG. 5). Then, within each buffer (i.e. for a given sampled pulse-level position), the following steps are executed as shown in FIG. 6:

The correlations of the stored samples with all possible rotations of the PN sequence are computed. Each sum operator outputs one of the correlations.

The maximum of all these correlations is determined and is referred to as the output of this buffer. The corresponding code-level position is the selected code-level position for this given pulse-level position.

Finally, the outputs of the $L_s$ buffers are compared and the maximum is selected as the output of this timing acquisition phase. The pulse- and code-level position corresponding to this output is the estimated pulse- and code-level position in this timing acquisition phase. If the output is larger than the threshold, it can be concluded that a signal is present. Then, the signal detection step stops and the confirmation step starts. Otherwise, the signal detection step continues by utilizing another set of the received samples.

At least two possible versions of the PN sequence can be used to correlate the received signal with, thus resulting in two non-coherent correlation methods (consider PN alphabet versions that will result in a performance difference). The first version has the alphabet $\{0, +1\}$. Note that half of the elements in this version are zeros. Thus, the corresponding received samples will not be utilized. This is desirable when the received samples mainly contain noise. Discarding half of the noise is beneficial for reliable decisions. The second version has the alphabet $\{-1, +1\}$. Clearly, all the received samples will be utilized here. This is desirable when most of the received samples contain useful information. Utilizing all the information is better than discarding half of the useful information. Note that the received samples to be processed typically contain noise.

Step 3: Confirmation

This step is the same as the signal detection step except that now samples are averaged over several SHR bits. The extra averaging process has the advantage of reducing the variance of noisy signals and thereby increases the reliability of the timing acquisition algorithm in poor SNR scenarios. Furthermore it has the advantage of easing the computational burden for low-speed, yet low-power digital signal processing processors. This is because the calculation time of all correlations is extended from one SHR bit period to several SHR bit periods. When the output is larger than the threshold, a signal is assumed to be present. Then, the next step in the timing acquisition algorithm is started. Otherwise, the receiver returns to the signal detection step. Note that in this step it is assumed that the received samples to be processed typically contain signal. Thus, a PN sequence with alphabet $\{-1, +1\}$ can be chosen (if the received signal contains phase information). After passing the confirmation step, it is expected that the received samples always contain signals. A PN sequence with alphabet $\{-1, +1\}$ will thus be chosen.

Step 4: Two Timing Parameters Estimation

In this step, the focus is on estimating both the pulse- and the code-level positions. The principle of this step is the same as that of the confirmation. However, there is no threshold in this step to determine the presence of the signal packet. Instead, the maximal correlation result is considered. The corresponding pulse- and the code-level positions are the estimated ones in this step. Note that a finer timing resolution can be considered to determine the pulse-level position when necessary.

Step 5: SFD Detection

After the two timing parameters have been estimated, one knows where to start combining the received samples to correlate with the PN sequence for SHR bits demodulation. A PN sequence with alphabet {−1, +1} can be used for correlation. The correlation result is used to demodulate the signal. The receiver continuously demodulates the remaining SHR bits. It slides the demodulated signals and correlates with a replica of the SFD sequence until a given threshold is crossed. Note that the SFD is also a kind of PN sequence (for example, the second version is used, i.e. with alphabet {−1, +1}). If all the remaining evaluation criteria are met, the SFD is detected and the receiver starts to enter the data demodulation mode. In general, either the demodulated signals containing hard information or those containing soft information can be used to correlate with the SFD. For the hard information case each SHR bit −1 or +1 is determined and then correlated with the SFD. For the soft information case the correlation result associated with each SHR bit is used to correlate with the SFD.

If the correlation result for a sequence different from the SFD sequence is above the threshold, it is very likely that this sequence is the sequence the most similar to the SFD sequence in the preamble, except the SFD sequence itself. For this reason, it is possible to correlate the demodulate signal with this sequence, which can be determined in advance once the pattern of the preamble is known. This sequence is referred to as a predefined sequence. There are now two correlation results: one corresponding to the SFD sequence and one corresponding to the predefined sequence. If the first result is larger than the second, one can conclude that SFD is detected. Otherwise, the approach continues demodulating the bits until the criterion is met. The main advantage of using this sequence for correlation is that it can minimize the false alarm probability due to the predefined sequence, which is the most likely sequence for causing a false alarming SFD in the preamble. Furthermore, with the additional evaluation criterion, the threshold can be lowered to reduce the missed detection probability without significant increase of the false alarm probability.

A hardware implementation of the proposed SFD module is now described. The proposed SFD detect algorithm correlates bits with two sequences, i.e. the SFD sequence and the so called predefined sequence. Because of the additional correlation with the predefined sequence, the amount of needed gates (hardware) will increase. However, by sharing parts of hardware functions the amount of added logic can be reduced.

Figure 7:
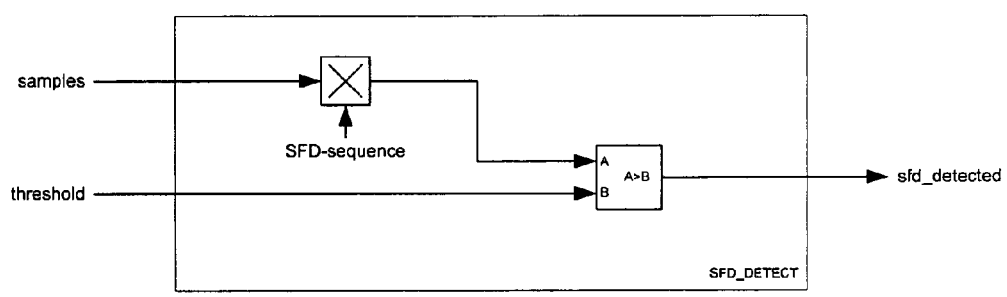
FIG. 7 illustrates a conventional SFD detection algorithm.
Figure 8:
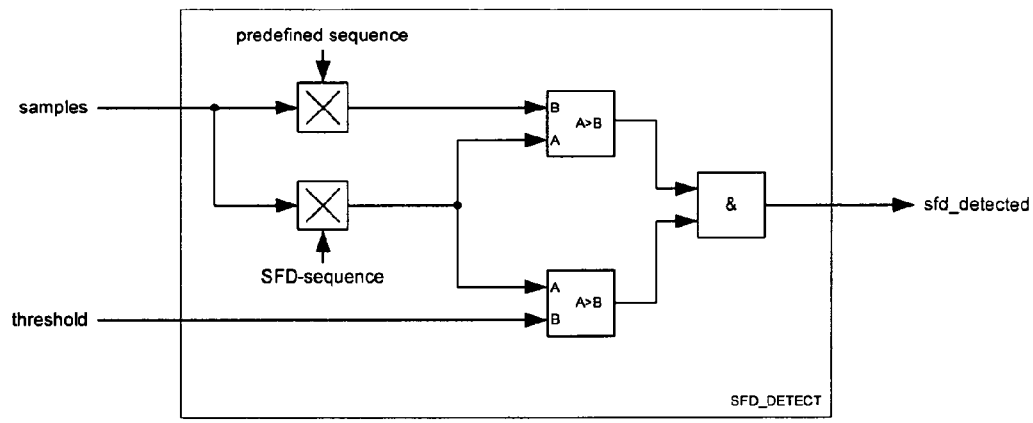
FIG. 8 illustrates an embodiment of the proposed SFD detection algorithm.

A hardware implementation of the SFD detection module of the invention has been compared with a conventional SFD detection unit. Post-layout simulation have been executed to compare both designs in terms of area and power. The block diagrams of both units are shown in FIG. 7 and FIG. 8. The first diagram (FIG. 7) shows a conventional SFD detection unit based on one correlation module and one comparator. The second block diagram (FIG. 8) depicts an embodiment of the proposed SFD algorithm containing two correlations (with the SFD and predefined sequence), two comparators and a logic and-unit. In terms of area and power consumption, the correlation modules are the dominating modules for both SFD detection algorithms. The fact that the proposed algorithm needs two correlation modules instead of one has influence related to area and power. However, because both correlation units use the same samples, parts of the two correlators can be shared.

Figure 9:
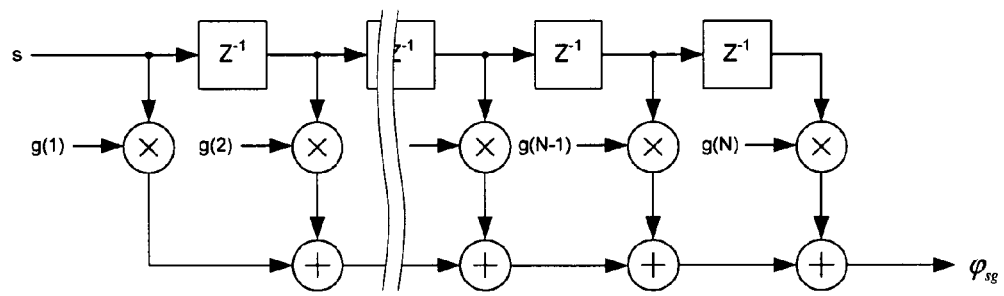
FIG. 9 illustrates an N-tap FIR filter.
Figure 10:
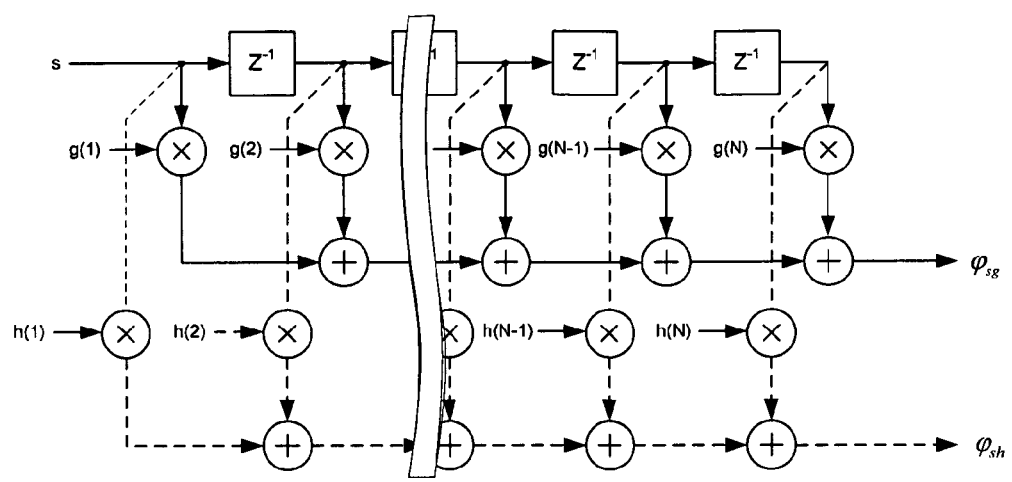
FIG. 10 illustrates an implementation of the proposed SFD detection algorithm.

The hardware implementation of a correlation function equals a finite impulse response filter with N taps, as shown in FIG. 9. The function to calculate the correlation value $\phi_{sg}$ between signal s and sequence g:

$$\varphi_{sg}(t) = \sum_{n=0}^{N} s(nT)g(t+nT)$$

can be implemented in hardware by a normal N-taps FIR (finite impulse response) filter shown in FIG. 9. When s equals the received bit stream of a package and g the SFD sequence used to indicate the start of the frame, $\phi_{sg}$ equals the correlation value. By sharing the delay/storage elements of this module the additional hardware needed to compute a second correlation value $\phi_{sh}$ can be reduced (see FIG. 10).

With post-layout power simulations, the dynamic and leakage power for both designs are compared. The values listed in Table 1 are extracted from a 60 μs post-layout simulation. The clock frequency is 6 MHz and the data rate of the samples is 1 MHz.

TABLE 1

Power Result

| | SFD detect module | | Complete |
|---|---|---|---|
| | Proposed | Conventional | synchronizer |
| Dynamic | 4.113 μW | 3.858 μW | 152.6 μW |
| Leakage | 61.62 nW | 46.590 nW | 1.94 μW |

Comparing the conventional design with the proposed design shows that the dynamic power increases with 6.6% and the leakage with 32% for the module itself. When the power of the whole receiver algorithm is taken into account (last column of Table 1) it is clear that the increase in power for the proposed SFD-detection algorithm is negligible (0.3% dynamic power, 0.7% leakage). Table 2 contains the needed area for the reference (i.e. conventional) and proposed algorithm:

TABLE 2

Area Result

| | SFD detect module | | Complete |
|---|---|---|---|
| | Reference | Proposed | synchronizer |
| Area | 4851 μm² | 7121 μm² | 142536 μm² |

The area increase of the proposed SFD-detection algorithm amounts to only 1.59% compared to area needed for the whole receiver algorithm.

Figure 11:
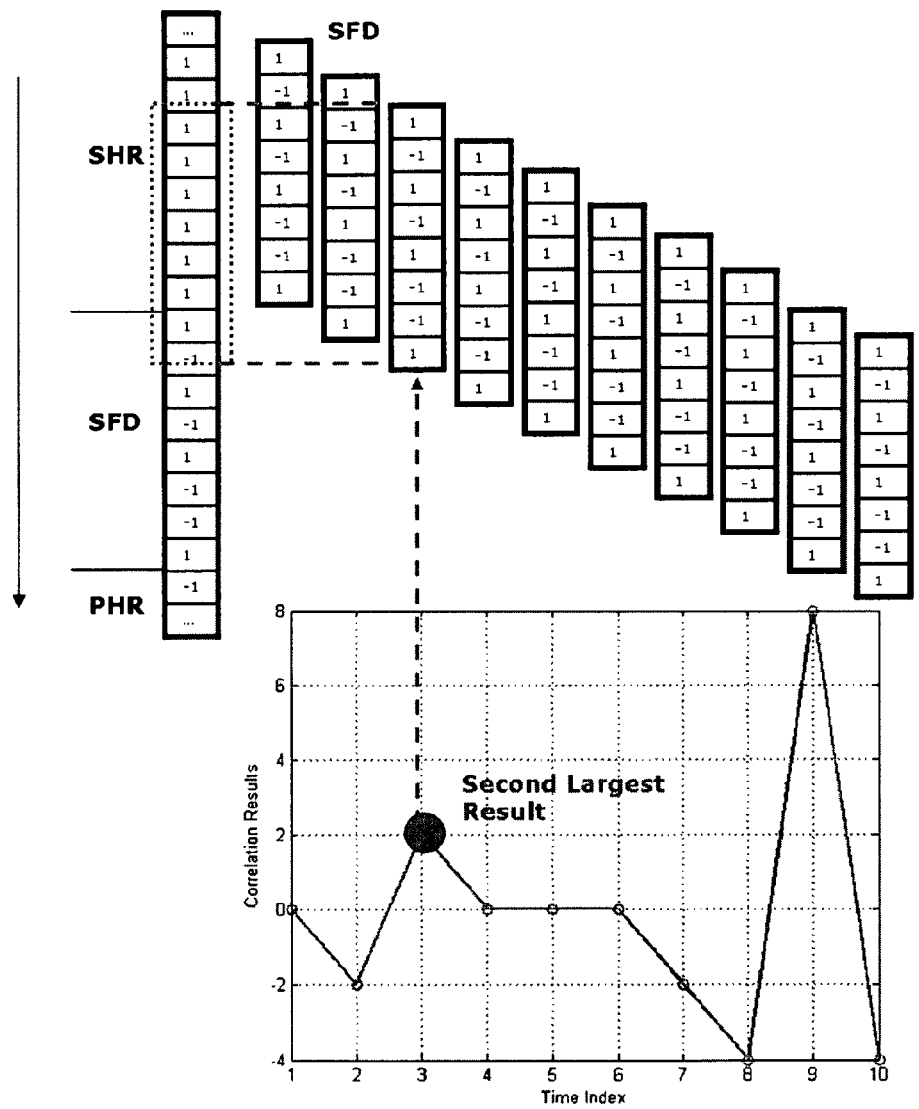
FIG. 11 illustrates the determination of a predefined sequence.

Computer simulations have been carried out to evaluate the performance of the timing acquisition algorithm. The SFD sequence considered is [−1 1 −1 1 1 −1 −1 1] (second version of PN sequence) and the SHR bits shown in FIG. 4 are all ones. The choice of the predefined sequence is made according to the determined preamble pattern. As shown in FIG. 11, the window slides downward and correlates with the SFD sequence. It can be seen that the largest correlation result is 8, which corresponds to the SFD sequence in the preamble. The second largest correlation result is 2, which corresponds to [1 1 1 1 1 1 −1 1]. This is the sequence positioned 6 bits before the SFD sequence. When the packet is wrongly synchronized, it is considered as a synchronization error.

Figure 12:
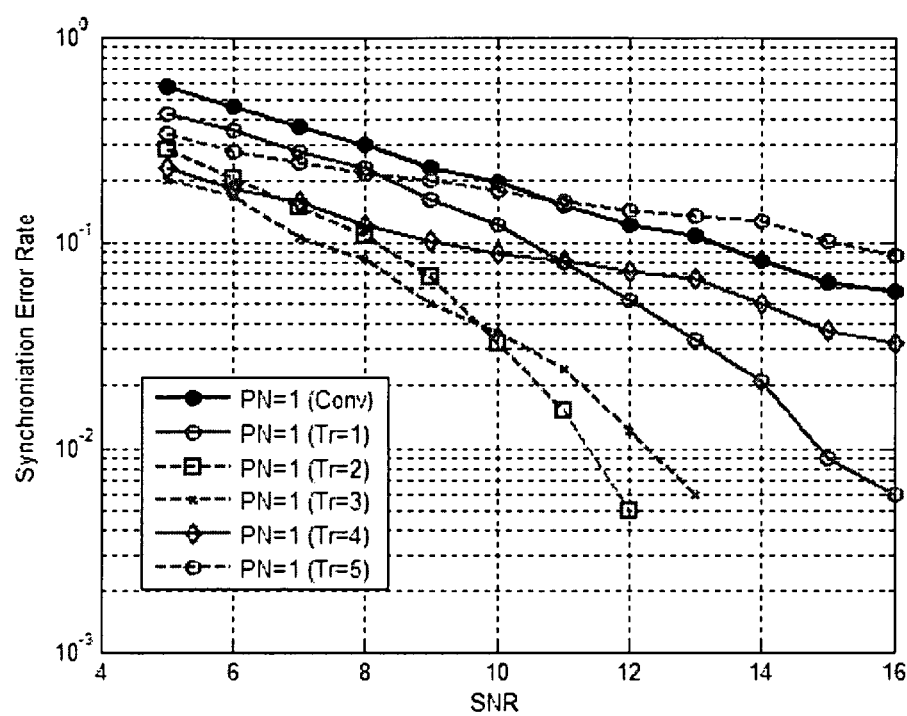
FIG. 12 shows a plot of the synchronization error rate for different SNRs when PN length is 1.

FIG. 12 plots synchronization error rate (SER) for different SNRs when the PN length is 1. The number in the bracket indicates the threshold used in the SFD step, which is a predetermined integer Tr times the estimated signal power divided by 2. 'Cony' refers to the conventional SFD detection and this is used where the second evaluation is not considered. In this case, the threshold is set to 4 times the estimated signal power divided by 2. From the figure, it is clear that the threshold will affect the SER significantly. It is found that at low SNR values with the threshold Tr being 3, using the additional evaluation as proposed in this invention can provide better performance. One finds that setting Tr=2 can achieve the best performance for SNR values above 10 dB.

Figure 13:
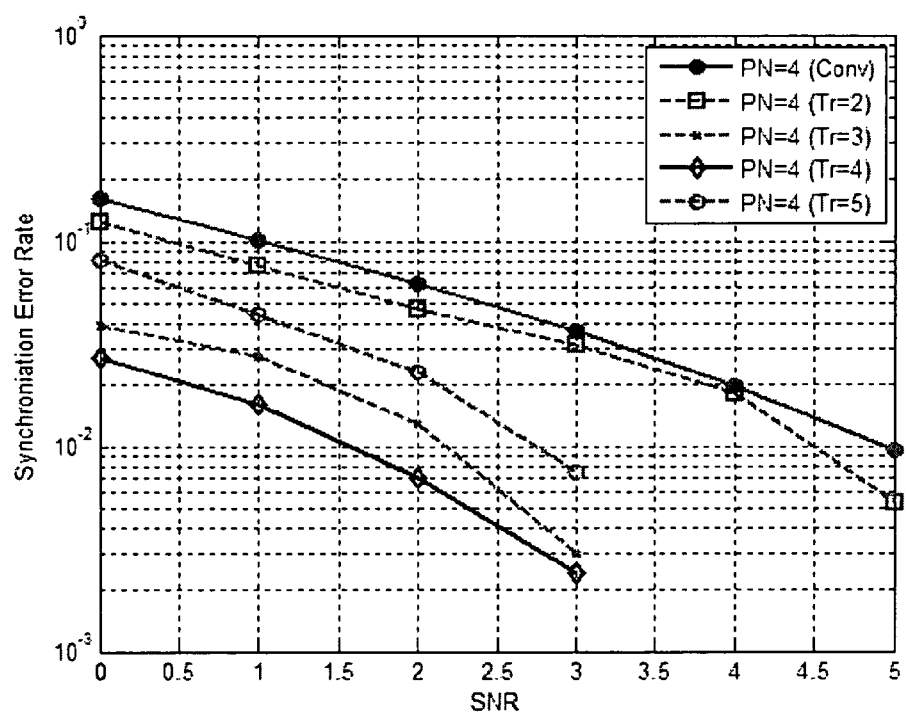
FIG. 13 shows a plot of the synchronization error rate for different SNRs when PN length is 4.

FIG. 13 plots SER for different SNRs when the PN length is 4. Using the additional evaluation as proposed can always provide better performance compared with the conventional SFD detection. Further, when setting Tr=4, the best performance is achieved. It has a 3.5 dB performance improvement when the SER is 1%.

Figure 14:
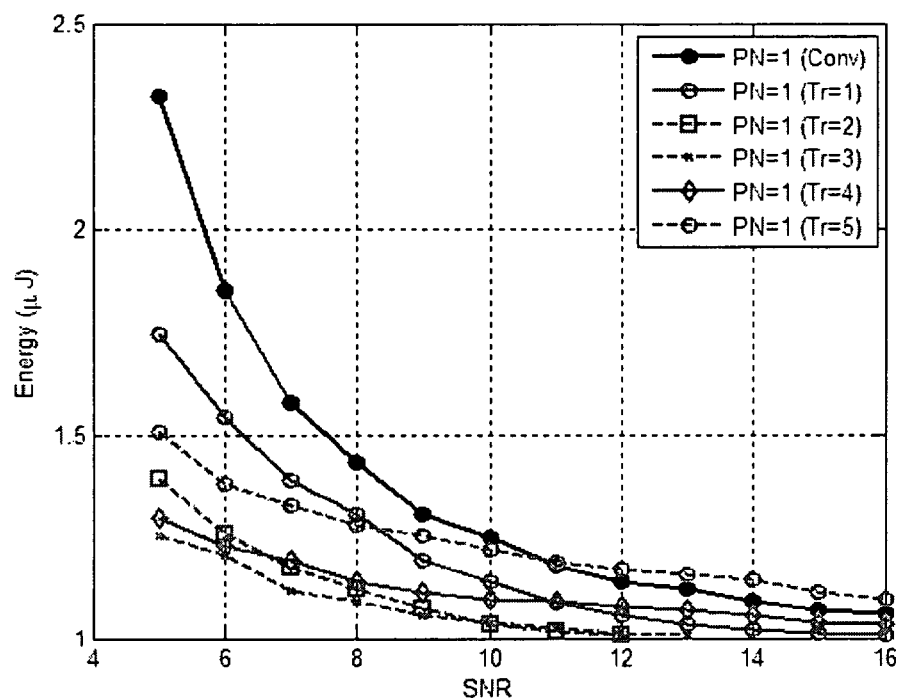
FIG. 14 shows a plot comparing the energy result for different SNRs when PN length is 1.

FIG. 14 plots energy results for different SNRs when the PN length is 1. Here it is assumed that the power consumption of the receiver is 10 mW. One packet has 1000 bits with a data rate of 1 Mbps. Thus, each packet consumes 10 µJ. Due to the SER, the packet needs to be retransmitted and results in an energy increase. The figure shows that when the target average energy for correctly receiving one packet is 12 µJ, setting Tr=3 can yield a 5 dB improvement compared with the conventional SFD detection.

Figure 15:
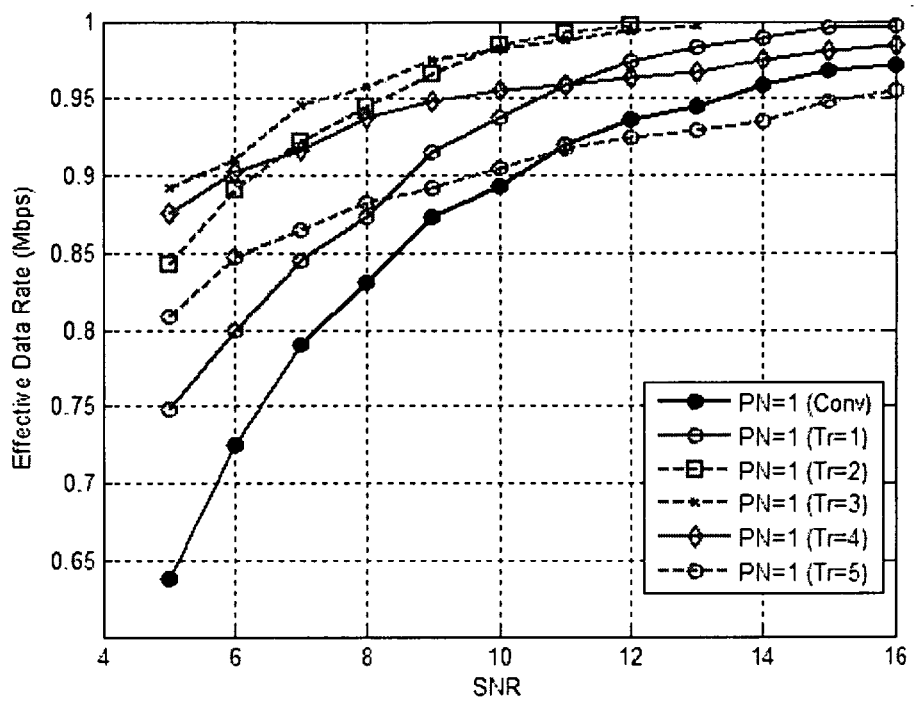
FIG. 15 shows a plot comparing the effective data rate for different SNRs when PN length is 1.

FIG. 15 plots effective data rates for different SNRs when the PN length is 1. Here a data rate of 1 Mbps is assumed. Due to the SER, the packet needs to be retransmitted and results in effective data rate decrease. From the figure it can be seen that when the target effective data rate is 0.9 Mbps, by setting Tr=3 around 5 dB improvement can be achieved compared with the conventional SFD detection.

Using the additional evaluation can always achieve better performance compared with the conventional SFD detection method. Adding that the implemented algorithm will negligibly increase the power consumption and chip size compared with the conventional algorithm, one has to conclude it is desirable to use the proposed algorithm for practical implementation of ultra low power wireless communication systems.

The invention claimed is:

1. A method for detecting a known start of frame delimiter pattern in a received stream of samples of a data packet, said data packet comprising at least a preamble portion and a header portion, said preamble portion preceding said header portion and containing said start of frame delimiter pattern, the method comprising the steps of:
   correlating a portion of said received stream of samples of said data packet with a first sequence corresponding to said start of frame delimiter pattern, thereby obtaining a first correlation result;
   comparing said first correlation result with a given threshold;
   correlating said portion of said received stream of samples with a second sequence, said second sequence derived from a pattern present in said preamble portion and different from said first sequence, thereby obtaining a second correlation result;
   comparing said first correlation result with said second correlation result;
   deciding that said start frame delimiter pattern has been detected, if said first correlation result is larger than said given threshold and larger than said second correlation result;
   otherwise, repeating the previous steps with a further portion of said first and second sequence.

2. The method of claim 1, comprising a step of determining said second sequence.

3. The method of claim 1, comprising at least one further step of correlating with a further sequence, said further sequence derived from a further pattern present in said preamble portion and different from said start frame delimiter pattern and said second sequence, thereby obtaining a further correlation result, and comparing said first correlation result with said further correlation result, whereby said first threshold should be larger than said further correlation result to detect said start of frame delimiter pattern.

4. The method of claim 1, wherein said given threshold is derived from a received noise power estimation.

5. The method of claim 1, wherein said second sequence has the same length as said first sequence.

6. The method of claim 5, wherein said second sequence is a pattern in said preamble portion that yields the largest correlation value when correlated with said start of frame delimiter pattern, leaving aside said first sequence.

7. A method for performing data acquisition on a stream of samples of data packets received in a receiver device, said method comprising the steps of:
   detecting in said receiver device a received data packet by correlating said stream of samples with a random sequence until a correlation result is obtained larger than or equal to a predetermined noise level threshold;
   estimating a sampling position for a code symbol of said random sequence and estimating a position for forming a bit by combining one or more code symbols; and
   detecting a start of frame delimiter pattern with the method of claim 1.

8. The method of claim 7, comprising the step of performing a noise power estimation and computing said predetermined noise level threshold from said noise power estimation.

9. The method of claim 7, wherein said random sequence contains one code symbol.

10. The method of claim 7, wherein said random sequence is a pseudo-noise sequence containing a plurality of code symbols, wherein said receiver device is a direct sequence spread spectrum receiver.

11. A device for detecting a known start of frame delimiter pattern, said device comprising:
   receiver means for receiving a stream of samples of a data packet, said data packet comprising at least a preamble portion and a header portion, said preamble portion preceding said header portion and containing said start of frame delimiter pattern;
   first correlator means for correlating a portion of said received stream of samples of said data packet with a first sequence corresponding to said start of frame delimiter pattern, thereby obtaining a first correlation result;
   first comparing means for comparing said first correlation result with a given threshold;
   second correlator means for correlating said portion of said received stream of samples with a second sequence, said second sequence derived from a pattern present in said preamble portion and different from said first sequence, thereby obtaining a second correlation result;
   second comparing means for comparing said first correlation result with said second correlation result; and
   combining means for combining outcomes of said first comparing means and said second comparing means.

12. The device of claim 11, wherein said first and second correlator means are sliding correlators.

13. The device of claim 11, wherein each of said first and second correlator means comprise a finite impulse response filter.

14. A device for detecting a known start of frame delimiter pattern, the device comprising:
- a receiver configured to receive a stream of samples of a data packet, said data packet comprising at least a preamble portion and a header portion, said preamble portion preceding said header portion and containing said start of frame delimiter pattern;
- a first correlation module configured to correlate a portion of said received stream of samples of said data packet with a first sequence corresponding to said start of frame delimiter pattern, thereby obtaining a first correlation result;
- a first comparator configured to compare said first correlation result with a given threshold;
- a second correlation module configured to correlate said portion of said received stream of samples with a second sequence, said second sequence derived from a pattern present in said preamble portion and different from said first sequence, thereby obtaining a second correlation result;
- a second comparator configured to compare said first correlation result with said second correlation result; and
- a logic and-unit configured to combine respective outcomes of said first comparator and said second comparator.

15. The device of claim 14, wherein at least some parts of the first correlation module and the second correlation module are shared between the first correlation module and the second correlation module.

16. The device of claim 15, wherein the at least some parts are selected from the group consisting of delay elements and storage elements.

17. The device of claim 14, wherein each of the first correlation module and the second correlation module comprise a finite impulse response filter.

18. The device of claim 14, wherein the first correlation module and the second correlation module are sliding correlators.

* * * * *